United States Patent
Wang et al.

(10) Patent No.: US 11,868,817 B2
(45) Date of Patent: Jan. 9, 2024

(54) LOAD BALANCING METHOD, APPARATUS AND DEVICE FOR PARALLEL MODEL TRAINING TASK, AND STORAGE MEDIUM

(71) Applicant: INSPUR ELECTRONIC INFORMATION INDUSTRY CO., LTD., Shandong (CN)

(72) Inventors: Li Wang, Shandong (CN); Kai Gao, Shandong (CN); Fang Cao, Shandong (CN); Zhenhua Guo, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 18/010,725

(22) PCT Filed: Feb. 20, 2021

(86) PCT No.: PCT/CN2021/076963
§ 371 (c)(1),
(2) Date: Dec. 15, 2022

(87) PCT Pub. No.: WO2022/001134
PCT Pub. Date: Jan. 6, 2022

(65) Prior Publication Data
US 2023/0195537 A1 Jun. 22, 2023

(30) Foreign Application Priority Data
Jun. 28, 2020 (CN) .......................... 202010597645.3

(51) Int. Cl.
*G06F 9/50* (2006.01)
(52) U.S. Cl.
CPC .... *G06F 9/5083* (2013.01); *G06F 2209/5022* (2013.01)

(58) Field of Classification Search
CPC ........................ G06F 9/5083; G06F 2209/5022
See application file for complete search history.

(56) References Cited

U.S. PATENT DOCUMENTS 9,985,984 B1   5/2018  Chavez et al.
2012/0302230 A1* 11/2012 Lim ...................... H04W 8/065
                                                            455/422.1
(Continued)

FOREIGN PATENT DOCUMENTS

| CN | 108829517 A | 11/2018 |
| CN | 109214504 A | 1/2019 |

(Continued)

OTHER PUBLICATIONS

Xiuling et al. CN 110018817A, EPO English Translation (Year: 2019).*

(Continued)

*Primary Examiner* — Bradley A Teets
*Assistant Examiner* — Willy W Huaracha
(74) *Attorney, Agent, or Firm* — Cooper Legal Group LLC

(57) ABSTRACT

A load balancing method, apparatus and device for a parallel model training task, and a computer-readable storage medium, includes: acquiring data traffic and a theoretical computational amount of each network layer in a target model; determining a theoretical computing capability of each computing device, and obtaining an initial computational amount corresponding to each computing device according to the theoretical computing capability and the theoretical computational amount; performing a load balancing operation according to the initial computational amount by using multiple device critical layer position division rule, so as to obtain a plurality of initial balancing schemes; compiling statistics on time performance parameters corresponding to the initial balancing schemes, and (Continued)

determining an intermediate balancing scheme from the initial balancing schemes according to the time performance parameters; and adjusting the intermediate balancing scheme according to the data traffic, so as to obtain a final balancing scheme.

14 Claims, 4 Drawing Sheets

(56) References Cited

U.S. PATENT DOCUMENTS

| | | | |
|---|---|---|---|
| 2019/0227887 A1 | 7/2019 | Hu et al. | |
| 2020/0019315 A1* | 1/2020 | Chadwell | G06F 3/0653 |
| 2020/0042362 A1* | 2/2020 | Cui | G06F 12/0207 |
| 2023/0214370 A1* | 7/2023 | Michaelis | G06N 20/00 706/25 |

FOREIGN PATENT DOCUMENTS

| | | |
|---|---|---|
| CN | 109559734 A | 4/2019 |
| CN | 109598250 A | 4/2019 |
| CN | 110018817 A | 7/2019 |
| CN | 110046048 A | 7/2019 |
| CN | 110503201 A | 11/2019 |
| CN | 110619595 A | 12/2019 |
| CN | 110689115 A | 1/2020 |
| CN | 110889439 A | 3/2020 |
| CN | 110909886 A | 3/2020 |
| CN | 111210019 A | 5/2020 |
| CN | 111316199 A | 6/2020 |
| CN | 111752713 A | 10/2020 |

OTHER PUBLICATIONS

Corresponding International Patent Application No. PCT/CN2021/076963, International Search Report, dated May 19, 2021.
Corresponding International Patent Application No. PCT/CN2021/076963, Written Opinion, dated May 20, 2021.
Corresponding Chinese Patent Application No. 202010597645.3, Notification to Grant, dated Jul. 14, 2022.
Yu-Hsin Chen, et al., "Eyeriss: A Spatial Architecture for Energy-Efficient Dataflow for Convolutional Neural Networks", 2016 ACM/IEEE 43rd Annual International Symposium on Computer Architecture (ISCA), Jun. 18-22, 2016, pp. 367-379.
Hu-Ming Zhu, et al., "Review of Parallel Deep Neural Network", Chinese Journal of Computers, Aug. 2018, pp. 1861-1881, vol. 41, No. 8. English Abstract.

* cited by examiner

LOAD BALANCING METHOD, APPARATUS AND DEVICE FOR PARALLEL MODEL TRAINING TASK, AND STORAGE MEDIUM

This application claims priority to Chinese Patent Application No. 202010597645.3, filed on Jun. 28, 2020, in China National Intellectual Property Administration and entitled "Load Balancing Method, Apparatus and Device for Parallel Model Training Task, and Storage Medium", the contents of which are hereby incorporated by reference in its entirety.

FIELD

The present disclosure relates to the technical field of parallel training, and particularly to a load balancing method for a parallel model training task, a load balancing apparatus for a parallel model training task, a load balancing device for a parallel model training task, and a computer-readable storage medium.

BACKGROUND

In recent years, with the rise of Artificial Intelligence (AI), Deep Neural Network (DNN) has been applied extensively to image and video classification, voice recognition, language translation, and other fields. As a training data set is enlarged and a network scale becomes increasingly complex, the training cost of a deep neural network has increased, a higher requirement has been made for a computing capability of a computing platform, and parallelization of model training has become an urgent need to enhance the timeliness of its application. In recent years, distributed-training-based AI accelerators (such as a Field-Programmable Gate Array (FPGA), a Tensor Processing Unit (TPU), and an AI chip) have emerged one after another, providing a hardware foundation for parallel training of deep neural networks.

When a DNN model is in a relatively large scale and cannot be entirely deployed on a single computing device, the model is trained by parallel model training. Parallel model training involves model division between devices such that each computing device evaluates only a portion of model parameters and performs updating. In the prior art, a DNN model is generally divided manually and trained by a worker by experience. However, manual division cannot implement load balancing relatively well, amounts of computation to be performed on various computing devices differ greatly, and the overall training efficiency is relatively low. Therefore, the prior art has the problems of load imbalance and relatively low overall training efficiency.

Therefore, how to solve the problems in the prior art of load imbalance and relatively low overall training efficiency is a technical problem those skilled in the art need to solve.

SUMMARY

In view of this, an objective of the present disclosure is to provide a load balancing method for a parallel model training task, a load balancing apparatus for a parallel model training task, a load balancing device for a parallel model training task, and a computer-readable storage medium. The problems in the prior art of load imbalance and relatively low overall training efficiency are solved.

In order to solve the foregoing technical problem, the present disclosure provides a load balancing method for a parallel model training task, including:

acquiring data traffic and a theoretical computational amount of each network layer in a target model;

determining a theoretical computing capability of each computing device, and obtaining an initial computational amount corresponding to each computing device according to the theoretical computing capability and the theoretical computational amount;

performing a load balancing operation according to the initial computational amount by using multiple device critical layer position division rule, so as to obtain a plurality of initial balancing schemes;

compiling statistics on time performance parameters corresponding to the initial balancing schemes, and determining an intermediate balancing scheme from the initial balancing schemes according to the time performance parameters; and adjusting the intermediate balancing scheme according to the data traffic, so as to obtain a final balancing scheme.

In some embodiments, the performing a load balancing operation according to the initial computational amount by using multiple device critical layer position division rule, so as to obtain a plurality of initial balancing schemes includes:

dividing a network layer to each computing device according to the initial computational amount in network layer order, and detecting a device critical layer;

when the device critical layer is detected, dividing the device critical layer to a preceding computing device, so as to obtain a first balancing scheme, where the preceding computing device is a computing device that a preceding network layer corresponding to the device critical layer belongs to;

when the device critical layer is detected, dividing the device critical layer to a subsequent computing device, so as to obtain a second balancing scheme, where the subsequent computing device is a computing device that a subsequent network layer corresponding to the device critical layer belongs to; and determining the first balancing scheme and the second balancing scheme as the initial balancing schemes.

In some embodiments, the compiling statistics on time performance parameters corresponding to the initial balancing schemes and determining an intermediate balancing scheme from the initial balancing schemes according to the time performance parameters includes:

compiling statistics on computing time corresponding to each computing device in the initial balancing scheme, and calculating a time average and a time standard deviation corresponding to the initial balancing scheme by use of the computing time, so as to obtain the time performance parameter;

determining whether the time average is less than a first threshold and whether the time standard deviation is less than a second threshold;

if YES, determining the initial balancing scheme as a candidate balancing scheme; and when a number of candidate balancing schemes is 1, determining the candidate balancing scheme as the intermediate balancing scheme, or when a number of candidate balancing schemes is not 1, selecting the intermediate balancing scheme from the candidate balancing schemes according to a preset selection rule.

In some embodiments, the adjusting the intermediate balancing scheme according to the data traffic, so as to obtain a final balancing scheme includes:

obtaining communication time of each computing device according to the data traffic and a network layer communication speed of each computing device, and obtaining total time corresponding to the computing device by use of the communication time and computing time;

determining maximum total time, and performing a network layer division optimization process on a target computing device corresponding to the maximum total time in the intermediate balancing scheme, so as to obtain an optimized balancing scheme;

determining the optimized balancing scheme as the intermediate balancing scheme, and updating an optimization count; and determining the intermediate balancing scheme as the final balancing scheme when the optimization count reaches a preset optimization count threshold.

In some embodiments, the performing a network layer division optimization process on a target computing device corresponding to the maximum total time in the intermediate balancing scheme, so as to obtain an optimized balancing scheme includes:

reducing one layer from network layers corresponding to the target computing device, and adjusting network layers corresponding to the other computing devices, so as to obtain a first optimized scheme;

reducing two layers from the network layers corresponding to the target computing device, and adjusting the network layers corresponding to the other computing devices, so as to obtain a second optimized scheme;

compiling statistics on a first time performance parameter corresponding to the first optimized scheme and a second time performance parameter corresponding to the second optimized scheme;

determining a candidate optimized scheme from the first optimized scheme and the second optimized scheme according to the first time performance parameter and the second time performance parameter; and determining the optimized balancing scheme from the candidate optimized scheme and the intermediate balancing scheme according to a candidate time performance parameter corresponding to the candidate optimized scheme and the time performance parameter.

In some embodiments, the acquiring data traffic and a theoretical computational amount of each network layer in a target model includes:

acquiring parameter information and input/output information corresponding to each network layer; and calculating the theoretical computational amount by use of the parameter information, and calculating the data traffic by use of the input/output information.

In some embodiments, after the final balancing scheme is obtained, the method further includes:

splitting the target model according to the final balancing scheme, so as to obtain a plurality of network layer groups; and sending each network layer group to the corresponding computing device for training.

The present disclosure also provides a load balancing apparatus for a parallel model training task, including:

an acquisition module, configured to acquire data traffic and a theoretical computational amount of each network layer in a target model;

an initial computational amount determining module, configured to determine a theoretical computing capability of each computing device, and obtain an initial computational amount corresponding to each computing device according to the theoretical computing capability and the theoretical computational amount;

an initial scheme acquisition module, configured to perform a load balancing operation according to the initial computational amount by using multiple device critical layer position division rule, so as to obtain a plurality of initial balancing schemes;

an intermediate scheme determining module, configured to compile statistics on time performance parameters corresponding to the initial balancing schemes, and determine an intermediate balancing scheme from the initial balancing schemes according to the time performance parameters; and a final scheme acquisition module, configured to adjust the intermediate balancing scheme according to the data traffic, so as to obtain a final balancing scheme.

The present disclosure also provides a load balancing device for a parallel model training task, including a memory and a processor.

The memory is configured to store a computer program.

The processor is configured to execute the computer program to implement the load balancing method for a parallel model training task.

The present disclosure also provides a computer-readable storage medium configured to store a computer program, where the computer program is executed by a processor to implement the load balancing method for a parallel model training task.

According to the load balancing method for a parallel model training task in the present disclosure, data traffic and a theoretical computational amount of each network layer in a target model are acquired; a theoretical computing capability of each computing device is determined, and an initial computational amount corresponding to each computing device is obtained according to the theoretical computing capability and the theoretical computational amount; a load balancing operation is performed according to the initial computational amount by using multiple device critical layer position division rule, so as to obtain a plurality of initial balancing schemes; statistics on time performance parameters corresponding to the initial balancing schemes is compiled, and an intermediate balancing scheme is determined from the initial balancing schemes according to the time performance parameters; and the intermediate balancing scheme is adjusted according to the data traffic, so as to obtain a final balancing scheme.

It might be seen that, in the method, initial computational amounts corresponding to various computing devices are obtained according to theoretical computing capabilities of the computing devices and a theoretical computational amount of a target model, and a load balancing operation is performed on network layers in the target model according to the initial computational amounts by using multiple device critical layer position division rule, so as to obtain a plurality of different balancing schemes, i.e., initial balancing schemes. Statistics on time performance parameters is compiled to determine time performance of the plurality of technical schemes, and the initial balancing scheme with higher performance is selected as an intermediate balancing scheme. The intermediate balancing scheme is finally adjusted in consideration of the impact of data communication between the computing devices, so as to obtain a final balancing scheme. The initial computational amounts are obtained according to the theoretical computing capabilities, and the initial balancing schemes are obtained accordingly, whereby amounts of data involved in computation of the various computing device may be balanced relatively well. The overall computational efficiency of all the computing devices in the initial balancing scheme may be represented by the time performance parameter. The intermediate balancing scheme is finally adjusted in consideration of the impact of a data communication process on each computing device to obtain the final balancing scheme. Therefore, a load of each computing device may be balanced, the overall computational efficiency, i.e., the training efficiency, may be ensured, and the problems in the prior art of load imbalance and relatively low training efficiency are solved.

In addition, the present disclosure also provides a load balancing apparatus, for a parallel model training task, a load balancing device for a parallel model training task, and a computer-readable storage medium, at least one of which have the foregoing beneficial effects also.

BRIEF DESCRIPTION OF THE DRAWINGS

In order to describe the technical solutions in embodiments of the present disclosure or the prior art more clearly, the drawings required to be used in descriptions about the embodiments or the prior art will be introduced briefly below. Apparently, the drawings in the description below are merely embodiments of the present disclosure. Those ordinarily skilled in the art may further obtain other drawings according to the provided drawings without creative work.

DETAILED DESCRIPTION

In order to make the objective, technical solutions, and advantages of the embodiments of the present disclosure clearer, the technical solutions in the embodiments of the present disclosure will be described clearly and completely below in combination with the drawings in the embodiments of the present disclosure. Clearly, the described embodiments are not all but only part of embodiments of the present disclosure. All other embodiments obtained by those ordinarily skilled in the art based on the embodiments in the present application without creative work shall fall within the scope of protection of the present application.

Figure 1:
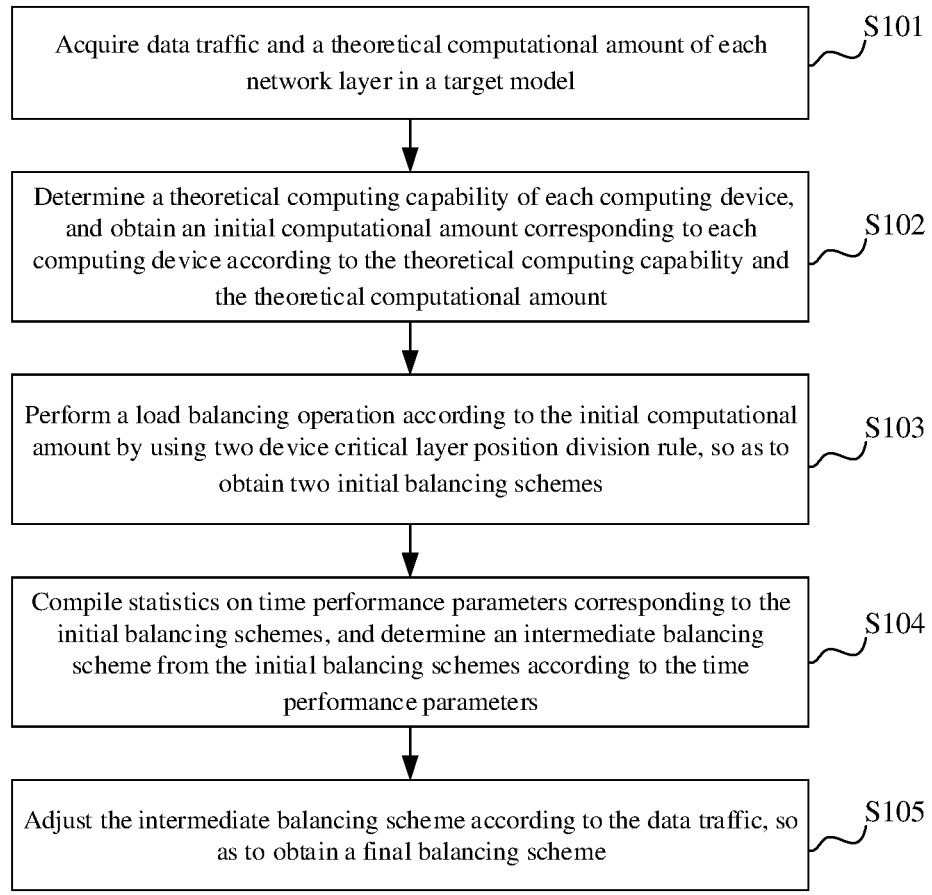
FIG. 1 is a flowchart of a load balancing method for a parallel model training task according to an embodiment of the present disclosure.

In a possible implementation mode, referring to FIG. 1, FIG. 1 is a flowchart of a load balancing method for a parallel model training task according to an embodiment of the present disclosure. The method includes the following steps.

In S101, data traffic and a theoretical computational amount of each network layer in a target model are acquired.

The target model is a network model required to be trained in parallel on multiple computing devices, in some embodiments a deep learning model or another network model with network layers. In some embodiments, the target model may be an image classification model, a voice recognition model, a language translation model, etc. The computing device is not limited to a specific type, and for example, may be a heterogeneous acceleration device, i.e., an acceleration device constructed based on multiple different architectures. In some embodiments, the architecture may be an FPGA architecture, a Tensor Processing Unit (TPU) architecture, or a Graphics Processing Unit (GPU) architecture.

The target model includes multiple network layers. When a balancing scheme for the target model is determined, it is necessary to determine data traffic and a theoretical computational amount of each network layer. Since each network layer has data inputs and data outputs, the data traffic may in some embodiments be a data input quantity or data output quantity of the network layer, depending on an actual situation. The theoretical computational amount is the theoretical total number of computing resources required by training of the network layer. The data traffic and the theoretical computational amount are the greatest influencing factors that affect time required to train the target model. If the data traffic and the theoretical computational amount are greater, more time is required to train the corresponding network layer.

In S102, a theoretical computing capability of each computing device is determined, and an initial computational amount corresponding to each computing device is obtained according to the theoretical computing capability and the theoretical computational amount.

In some embodiments, there are multiple computing devices, each of which has a corresponding theoretical computing capability. The theoretical computing capability may represent a computing speed of the computing device, whose specific magnitude is related to the computing device itself, and no limits are made thereto. A computing capability of each computing device may be determined according to the theoretical computing capability, and thus a load corresponding to a whole target network may be distributed to each computing device in a balanced manner according to the theoretical computing capability and the theoretical computational amount corresponding to each network layer, to obtain a corresponding initial computational amount. In some embodiments, a higher theoretical computing capability corresponds to a larger initial computational amount, and a lower theoretical computing capability corresponds to a smaller initial computational amount. Therefore, each computing device may spend the same time on completing computation of a corresponding initial computational amount during training under an ideal condition. As such, the situation that some computing devices that complete computation need to wait for the other computing devices that do not complete computation is avoided, and the basic overall computing efficiency is ensured.

In some embodiments, a performance model may be constructed and solved to obtain the initial computational amount after the theoretical computing capability of each computing device is obtained. Construction and solving of the performance model are not limited in the present embodiment, and may refer to the prior art. Alternatively, a unit normalization process is performed on each theoretical computing capability to represent each theoretical computing capability in the same representation form, and meanwhile, a training load of the target network is calculated by use of the theoretical computational amount of each network layer, and is distributed to the corresponding computing device according to a proportion of each theoretical computing capability, so as to determine the initial computational amount corresponding to each computing device.

In S103, a load balancing operation is performed according to the initial computational amount by using multiple device critical layer position division rule, so as to obtain a plurality of initial balancing schemes.

The network layer is a minimum division unit of the target network, while the theoretical computational amount of the network layer has a certain lower limit, so a load of the corresponding initial computational amount may not be distributed to each computing device perfectly during actual division of the network layer. Therefore, the network layer is divided, namely a load balancing operation is performed, based on the initial computational amount by using multiple different device critical layer position division rule, so as to obtain a plurality of initial balancing schemes.

It is to be noted that a device critical layer is a special network layer, a load that has been distributed to a first device corresponding to the device critical layer is less than the corresponding initial computational amount, but when the device critical layer is divided to the first device, the load of the first device is greater than the corresponding initial computational amount, so the device critical layer may be divided to a second device or the first device. Therefore, the device critical layer is between two computing devices when divided, namely it may be divided to any one of the two computing devices. Therefore, the device critical layer has two optional positions, i.e., the first device or the second device. Based on the two possible positions, multiple corresponding device critical layer position division rule may be set, such as a rule of dividing all device critical layers to the first device, or a rule of dividing all device critical layers to the second device, or a rule of dividing part of device critical layers to the first device and the other device critical layers to the second device. A plurality of initial balancing schemes may be obtained according to the multiple device critical layer position division rule. The initial balancing schemes maximally ensure the balance of computing loads between the computing devices.

In S104, statistics on time performance parameters corresponding to the initial balancing schemes is compiled, and an intermediate balancing scheme is determined from the initial balancing schemes according to the time performance parameters.

A computing load actually distributed to each computing device is not necessarily equal to the initial computational amount, so training based on the initial balancing schemes may result in the situation that some computing devices have completed computation but the other computing devices do not complete computation, and if the situation is serious, the overall computing efficiency of all the computing devices may be affected, namely the overall training efficiency is affected.

Therefore, statistics on time performance parameters corresponding to the plurality of initial balancing schemes is compiled after the initial balancing schemes are obtained. The time performance parameter is used for representing time performance of the initial balancing scheme, and may in some embodiments be a computing time average, time standard deviation, time variance, or other similar parameters of each computing device. The number of the time performance parameter may be one or more. After the time performance parameters of the plurality of initial balancing schemes are obtained statistically, the scheme corresponding to the best time performance parameter is selected as an intermediate balancing scheme from the initial balancing schemes according to superiority-inferiority of the time performance parameters. A method for evaluating the time performance parameter is not limited in the present embodiment, and may be set according to the number and type of the time performance parameter.

In S105, the intermediate balancing scheme is adjusted according to the data traffic, so as to obtain a final balancing scheme.

After the intermediate balancing scheme is determined, the intermediate balancing scheme is adjusted according to the data traffic and the time performance parameter. Data communication also requires certain time, and different data traffic of the network layers corresponds to different time that is required. Therefore, it is necessary to modify the intermediate balancing scheme in consideration of the impact of data communication, and perform evaluation by use of the time performance parameter after modification, to implement adjustment of the intermediate balancing scheme to obtain a final balancing scheme. The final balancing scheme comprehensively considers the impact of two aspects, i.e., data transmission and computation, and implements balanced load distribution.

With the application of the load balancing method for a parallel model training task in the embodiment of the present disclosure, initial computational amounts corresponding to various computing devices are obtained according to theoretical computing capabilities of the computing devices and a theoretical computational amount of a target model, and a load balancing operation is performed on network layers in the target model according to the initial computational amounts by using multiple device critical layer position division rule, so as to obtain a plurality of different balancing schemes, i.e., initial balancing schemes. Statistics on time performance parameters is compiled to determine time performance of the plurality of technical schemes, and the initial balancing scheme with higher performance is selected as an intermediate balancing scheme. The intermediate balancing scheme is finally adjusted in consideration of the impact of data communication between the computing devices, so as to obtain a final balancing scheme. The initial computational amounts are obtained according to the theoretical computing capabilities, and the initial balancing schemes are obtained accordingly, whereby amounts of data involved in computation of the various computing device may be balanced relatively well. The overall computational efficiency of all the computing devices in the initial balancing scheme may be represented by the time performance parameter. The intermediate balancing scheme is finally adjusted in consideration of the impact of a data communication process on each computing device to obtain the final balancing scheme. Therefore, a load of each computing device may be balanced, the overall computational efficiency, i.e., the training efficiency, may be ensured, and the problems in the prior art of load imbalance and relatively low training efficiency are solved.

Based on the above-mentioned embodiments, a plurality of steps in the above-mentioned embodiments will be further described in the following embodiments. In order to accurately obtain the data traffic and theoretical computational amount of each network layer, the data traffic and the theoretical computational amount may be calculated based on parameter information and input/output information of the network layer. Step S101 may include the following steps.

In S1011, parameter information and input/output information corresponding to each network layer are acquired.

In some embodiments, a forward computing network may be constructed, and the parameter information and the input/output information are acquired by use of the forward computing network. The parameter information is used for representing specific computation over the network layer, and may also be referred to as operator parameter information, and its specific content is not limited in the present embodiment. For example, the parameter information may be convolution kernel size information, or may further include input/output information. The input/output information may in some embodiments be input information or output information that is set in advance in the same direction as the data traffic. That is, the input/output information is input information when the data traffic is a data input quantity, and the input/output information is output information when the data traffic is a data output quantity. The input/output information is used for representing an input or output situation of the network layer, whose specific content may be the number of features, a feature size, etc., and no limits are made thereto.

In S1012, the theoretical computational amount is calculated by use of the parameter information, and the data traffic is calculated by use of the input/output information.

The theoretical computational amount may be calculated according to the parameter information. Since the parameter information represents specific computation required by the network layer, the corresponding theoretical computational amount may be determined accurately. Similarly, the corresponding data traffic may be calculated accurately by use of the input/output information.

Based on the above-mentioned embodiments, when the initial balancing schemes are determined, the load balancing operation may be performed by using two device critical layer position division rule, so as to increase the speed of determining the initial balancing schemes, reduce required computing resources, and further reduce computing resources required to obtain the final balancing scheme. In some embodiments, step S103 may include the following steps.

In S1031, a network layer is divided to each computing device according to the initial computational amount in network layer order, and a device critical layer is detected.

Since the target network is required to be trained in network layer order, the network layers are divided in network layer order. A network layer is divided to each computing device according to the initial computational amount corresponding to the computing device, and a device critical layer is detected during division of the network layer. In some embodiments, the device critical layer may be detected by detecting the following situations.

Whether a current load of a target computing device is less than a corresponding initial computational amount is determined. If the current load is less than the corresponding initial computational amount, a target network layer is divided to the target computing device, and whether the current load of the target computing device is greater than the corresponding initial computational amount is simultaneously determined. If YES, the target network layer is determined as a device critical layer, namely the device critical layer is detected. For example, if computing device 1 is before computing device 2, computing device 1 corresponds to an initial computational amount of 1,000 and has a current load of 990, and the current load of computing device 1 is 1,010 when a target network layer is divided to computing device 1, the target network layer is a device critical layer.

In S1032, when the device critical layer is detected, the device critical layer is divided to a preceding computing device, so as to obtain a first balancing scheme.

When the device critical layer is detected, the device critical layer may be divided to a preceding computing device, namely all device critical layers are divided to the preceding computing device, so as to obtain a first balancing scheme. It is to be noted that the preceding computing device is a computing device that a preceding network layer corresponding to the device critical layer belongs to, and the preceding network layer is a network layer sequenced before the device critical layer. Therefore, the preceding computing device is computing device 1 in the example of step S1031. Based on the above example, a final computing load of computing device 1 is 1,010.

In S1033, when the device critical layer is detected, the device critical layer is divided to subsequent computing device, so as to obtain a second balancing scheme.

When the device critical layer is detected, the device critical layer may be divided to a subsequent computing device, namely all device critical layers are divided to the subsequent computing device, so as to obtain a second balancing scheme. It is to be noted that the subsequent computing device is a computing device that a subsequent network layer corresponding to the device critical layer belongs to, and the subsequent network layer is a network layer sequenced after the device critical layer. Therefore, the subsequent computing device is computing device 2 in the example of step S1031. Based on the above example, a final computing load of computing device 1 is 990.

It is to be noted that the order of execution of the two steps S1032 and S1033 is not limited in the present embodiment. For example, S1032 may be executed before S1033. Alternatively, S1032 may be executed after S1033. Alternatively, S1032 and S1033 may be executed at the same time.

In S1034, the first balancing scheme and the second balancing scheme are determined as the initial balancing schemes.

After the first balancing scheme and the second balancing scheme are obtained, they are determined as the initial balancing schemes, so as to subsequently determine the intermediate balancing scheme.

Based on the above-mentioned embodiments, in order to ensure that the best intermediate balancing scheme is selected, the initial balancing schemes may be evaluated by use of multiple time performance parameters and thresholds, to finally obtain the intermediate balancing scheme. In some embodiments, step S104 may include the following steps.

In S1041, statistics on computing time corresponding to each computing device in the initial balancing scheme is compiled, and a time average and a time standard deviation corresponding to the initial balancing scheme are calculated by use of the computing time, so as to obtain the time performance parameter.

In some embodiments, two parameters of time average and time standard deviation are used as time performance parameters. In some embodiments, after the initial balancing schemes are obtained, statistics on computing time corresponding to each computing device in each initial balancing scheme is compiled according to the theoretical computing capability of the computing device, and a time average and a time standard deviation corresponding to each initial balancing scheme are calculated by use of the computing time. The time average is average computing time required by each computing device, and may reflect the overall computing capability. The time standard deviation may represent a difference between the computing time of each computing device. If the difference is greater, the overall computing efficiency is lower.

In S1042, whether the time average is less than a first threshold and whether the time standard deviation is less than a second threshold are determined.

The first threshold is used for comparison with the time average, and the second threshold is used for comparison with the time standard deviation. Specific magnitudes of the first threshold and the second threshold are not limited in the present embodiment, and may be set according to an actual situation.

In S1043, if YES, the initial balancing scheme is determined as a candidate balancing scheme.

When the time average of a certain initial balancing scheme is less than the first threshold, while the time standard deviation is less than the second threshold, it indicates that the time performance of the initial balancing scheme is relatively high, and thus the initial balancing scheme is determined as a candidate balancing scheme. The above steps are repeated until all of the initial balancing schemes are evaluated.

In S1044, when a number of candidate balancing schemes is 1, the candidate balancing scheme is determined as the intermediate balancing scheme.

After all of the initial balancing schemes are evaluated, the number of candidate balancing schemes may be obtained statistically. When there is only one candidate balancing scheme, the candidate balancing scheme may be determined directly as the intermediate balancing scheme.

In S1045, when a number of candidate balancing schemes is not 1, the intermediate balancing scheme is selected from the candidate balancing schemes according to a preset selection rule.

When the number of candidate balancing schemes is not 1, there are two situations: the number of candidate balancing schemes is greater than 1, or the number of candidate balancing schemes is 0.

When the number of candidate balancing schemes is greater than 1, such as two, the intermediate balancing scheme may be selected therefrom according to a preset selection rule. When the number of candidate balancing schemes is 0, all of the initial balancing schemes may be determined as candidate balancing schemes, and the intermediate balancing scheme is determined therefrom according to a preset selection rule.

Based on the above-mentioned embodiments, in order to balance total time required by each computing device, network layer division of the computing device with maximum total time may be optimized to reduce the total time thereof and further improve the overall computing efficiency. In some embodiments, step S105 may include the following steps.

In S1051, communication time of each computing device is obtained according to the data traffic and a network layer communication speed of each computing device, and total time corresponding to the computing device is obtained by use of the communication time and computing time.

The network layer communication speed is a data transmission speed between network layers in the computing device. The communication time corresponding to each computing device may be obtained according to the data traffic and the network layer communication speed. The computing time is time required by the computing device to compute all loads. The communication time and the computing time may be added to obtain the total time required by the computing device to process the load.

In S1052, maximum total time is determined, and a network layer division optimization process is performed on a target computing device corresponding to the maximum total time in the intermediate balancing scheme, so as to obtain an optimized balancing scheme.

The maximum total time is a maximum value in all total time. The maximum total time is determined to determine a target computing device, and a network layer division optimization process is performed on the target computing device. In some embodiments, a last network layer in the target computing device may be divided to a subsequent computing device of the target computing device, and so on, so as to complete the network layer division optimization process to obtain the optimized balancing scheme. Alternatively, a first network layer in the target computing device is divided to a preceding computing device of the target computing device, so as to complete the network layer division optimization process to obtain the optimized balancing scheme.

In order to ensure the effectiveness of the optimization process, namely ensuring an optimization effect, in the present embodiment, the network layers may be optimized twice, and the optimized balancing scheme is determined accordingly, in some embodiments as follows.

In S10521, one layer is reduced from network layers corresponding to the target computing device, and network layers corresponding to the other computing devices are adjusted, so as to obtain a first optimized scheme.

In a first optimization process, one layer is reduced from network layers corresponding to the target computing device, and meanwhile, network layers corresponding to the other computing devices are adjusted, so as to obtain a first optimized scheme. The reduced network layer may be a last network layer or a first network layer.

In S10522, two layers are reduced from the network layers corresponding to the target computing device, and the network layers corresponding to the other computing devices are adjusted, so as to obtain a second optimized scheme.

In a second optimization process, two layers may be reduced from the network layers corresponding to the target computing device, so as to obtain a second optimized scheme. The two network layers may be the last network layer and the first network layer, or the last network layer and a penultimate network layer, or the first network layer and a second network layer.

In S10523, statistics on a first time performance parameter corresponding to the first optimized scheme and a second time performance parameter corresponding to the second optimized scheme is compiled.

After the first optimized scheme and the second optimized scheme are obtained, statistics on a first time performance parameter corresponding to the first optimized scheme and a second time performance parameter corresponding to the second optimized scheme is compiled respectively. The process of compiling statistics on the first time performance parameter and the second time performance parameter refers to the above process, and will not be elaborated in the present embodiment.

In S10524, a candidate optimized scheme is determined from the first optimized scheme and the second optimized scheme according to the first time performance parameter and the second time performance parameter.

The first optimized scheme and the second optimized scheme are evaluated according to the first time performance parameter and the second time performance parameter, and the scheme with higher time performance is selected as a candidate optimized scheme.

In S10525, the optimized balancing scheme is determined from the candidate optimized scheme and the intermediate balancing scheme according to a candidate time performance parameter corresponding to the candidate optimized scheme and the time performance parameter.

After the candidate optimized scheme is obtained, the scheme with higher time performance is selected as the optimized balancing scheme from the candidate optimized scheme and the intermediate balancing scheme.

In S1053, the optimized balancing scheme is determined as the intermediate balancing scheme, and an optimization count is updated.

After this optimization process is completed, the optimized balancing scheme is determined as the intermediate balancing scheme, and an optimization count is updated. Since it is impossible to perform optimization processes infinitely, the optimization count is recorded as the number of optimization processes that have been performed for the intermediate balancing scheme.

In S1054, the intermediate balancing scheme is determined as the final balancing scheme when the optimization count reaches a preset optimization count threshold.

When the optimization count reaches a preset optimization count threshold, the intermediate balancing scheme is determined as the final balancing scheme, so as to complete a load balancing process of the target model.

Figure 2:
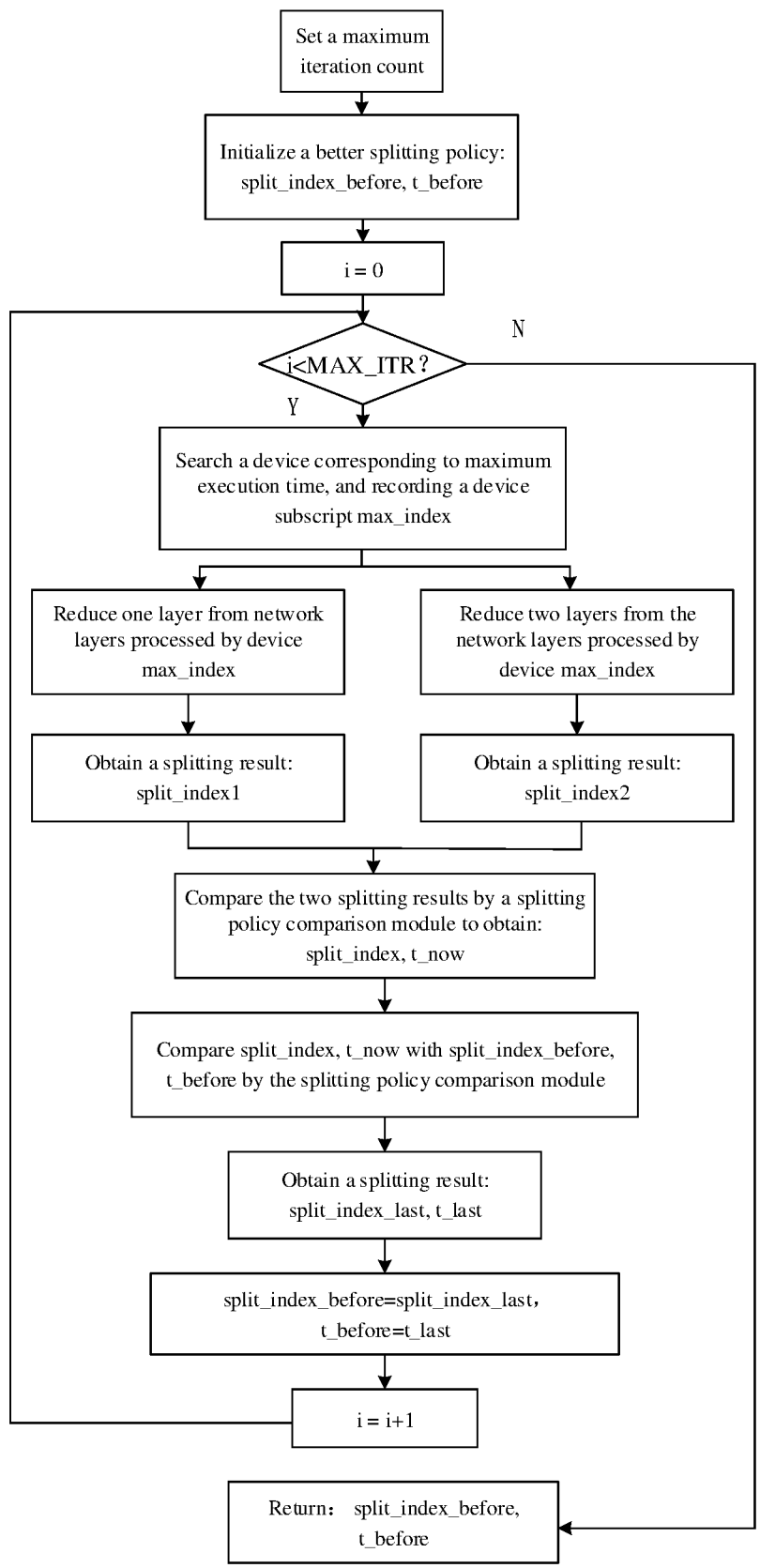
FIG. 2 is a flowchart of a specific method for adjusting an intermediate balancing scheme according to an embodiment of the present disclosure.

Referring to FIG. 2, FIG. 2 is a flowchart of a specific method for adjusting an intermediate balancing scheme according to an embodiment of the present disclosure. The maximum iteration count MAX_ITR is the preset optimization count threshold, and an initialized better splitting policy is split_index_before, corresponding to a time performance parameter of t_before. i represents the optimization count. When i<MAX_ITR is true, a device corresponding to maximum execution time, i.e., a target computing device, is searched, and a device subscript max_index is recorded, namely the target computing device is max_index. One layer is reduced from network layers processed by max_index to obtain a first optimized scheme split_index1, and two layers are reduced from the network layers processed by max_index to obtain a second optimized scheme split_index2. Statistics on a first time performance parameter and second time performance parameter corresponding to the two optimized schemes is compiled, and two splitting results are compared by a splitting policy comparison module to obtain a splitting result split_index with higher time performance, i.e., a candidate optimized scheme, corresponding to a time performance parameter of t_now. The candidate optimized scheme and the intermediate balancing scheme are evaluated to obtain an optimized balancing scheme split_index_last, corresponding to a time performance parameter of t_last. The optimized balancing scheme is determined as the intermediate balancing scheme, so as to complete assignment of split_index_before=split_index_last and assignment of t_before=t_last. 1 is added to the optimization count to redetermine whether i<MAX_ITR is true, and when i<MAX_ITR is false, split_index_before is returned, namely the intermediate balancing scheme is determined as a final balancing scheme.

Further, based on the above-mentioned embodiments, other operations may further be performed after the final balancing scheme is obtained. For example, the target model may further be split and trained. In some embodiments, the method may further include the following steps.

In step 11, the target model is split according to the final balancing scheme, so as to obtain a plurality of network layer groups.

The network layer corresponding to each computing device is recorded in the final balancing scheme, so the target network may be split accordingly to obtain a network layer group corresponding to each computing device.

In step 12, each network layer group is sent to the corresponding computing device for training.

A load balancing apparatus for a parallel model training task in the embodiments of the present disclosure will be introduced below. The load balancing apparatus for a parallel model training task described below may make corresponding references mutually with the load balancing method for a parallel model training task described above.

Figure 3:
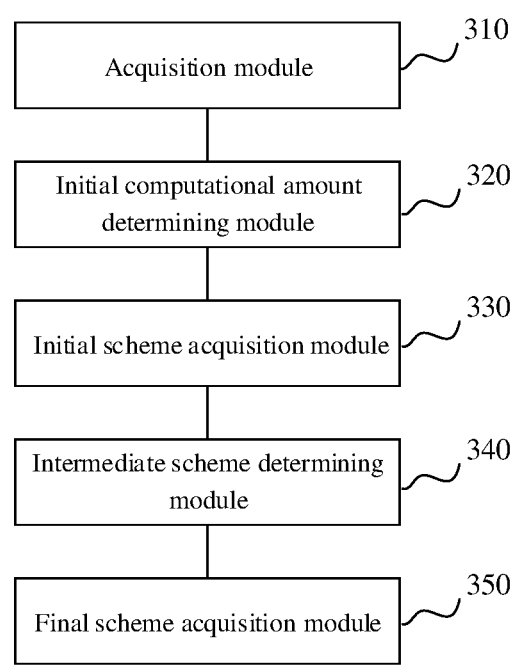
FIG. 3 is a schematic structural diagram of a load balancing apparatus for a parallel model training task according to an embodiment of the present disclosure.

Referring to FIG. 3, FIG. 3 is a schematic structural diagram of a load balancing apparatus for a parallel model training task according to an embodiment of the present disclosure, including:

an acquisition module 310, configured to acquire data traffic and a theoretical computational amount of each network layer in a target model;

an initial computational amount determining module 320, configured to determine a theoretical computing capability of each computing device, and obtain an initial computational amount corresponding to each computing device according to the theoretical computing capability and the theoretical computational amount;

an initial scheme acquisition module 330, configured to perform a load balancing operation according to the initial computational amount by using multiple device critical layer position division rule, so as to obtain a plurality of initial balancing schemes;

an intermediate scheme determining module 340, configured to compile statistics on time performance parameters corresponding to the initial balancing schemes, and determine an intermediate balancing scheme from the initial balancing schemes according to the time performance parameters; and a final scheme acquisition module 350, configured to adjust the intermediate balancing scheme according to the data traffic, so as to obtain a final balancing scheme.

In some embodiments, the initial scheme acquisition module 330 includes:

a device critical layer detection unit, configured to divide a network layer to each computing device according to the initial computational amount in network layer order, and detect a device critical layer;

a first balancing scheme determining unit, configured to, when the device critical layer is detected, divide the device critical layer to a preceding computing device, so as to obtain a first balancing scheme, where the preceding computing device is a computing device that a preceding network layer corresponding to the device critical layer belongs to;

a second balancing scheme determining unit, configured to, when the device critical layer is detected, divide the device critical layer to a subsequent computing device, so as to obtain a second balancing scheme, where the subsequent computing device is a computing device that a subsequent network layer corresponding to the device critical layer belongs to; and an initial balancing scheme determining unit, configured to determine the first balancing scheme and the second balancing scheme as the initial balancing schemes.

In some embodiments, the intermediate scheme determining unit 340 includes:

a time performance parameter acquisition unit, configured to compile statistics on computing time corresponding to each computing device in the initial balancing scheme, and calculate a time average and a time standard deviation corresponding to the initial balancing scheme by use of the computing time, so as to obtain the time performance parameter;

a judgment unit, configured to determine whether the time average is less than a first threshold and whether the time standard deviation is less than a second threshold;

a candidate balancing scheme determining unit, configured to, if the time average is less than the first threshold and the time standard deviation is less than the second threshold, determine the initial balancing scheme as a candidate balancing scheme;

a first determining unit, configured to, when a number of candidate balancing schemes is 1, determine the candidate balancing scheme as the intermediate balancing scheme; and a second determining unit, configured to, when a number of candidate balancing schemes is not 1, select the intermediate balancing scheme from the candidate balancing schemes according to a preset selection rule.

In some embodiments, the final scheme acquisition module 350 includes:

a total time calculation unit, configured to obtain communication time of each computing device according to the data traffic and a network layer communication speed of each computing device, and obtain total time corresponding to the computing device by use of the communication time and computing time;

an optimization processing unit, configured to determine maximum total time, and perform a network layer division optimization process on a target computing device corresponding to the maximum total time in the intermediate balancing scheme, so as to obtain an optimized balancing scheme;

an optimization count updating unit, configured to determine the optimized balancing scheme as the intermediate balancing scheme, and update an optimization count; and a final balancing scheme determining unit, configured to determine the intermediate balancing scheme as the final balancing scheme when the optimization count reaches a preset optimization count threshold.

In some embodiments, the optimization processing unit includes:

a first processing subunit, configured to reduce one layer from network layers corresponding to the target computing device, and adjust network layers corresponding to the other computing devices, so as to obtain a first optimized scheme;

a second processing subunit, configured to reduce two layers from the network layers corresponding to the target computing device, and adjust the network layers corresponding to the other computing devices, so as to obtain a second optimized scheme;

a time performance parameter statistical subunit, configured to compile statistics on a first time performance parameter corresponding to the first optimized scheme and a second time performance parameter corresponding to the second optimized scheme;

a candidate optimized scheme determining subunit, configured to determine a candidate optimized scheme from the first optimized scheme and the second optimized scheme according to the first time performance parameter and the second time performance parameter; and an optimized balancing scheme determining subunit, configured to determine the optimized balancing scheme from the candidate optimized scheme and the intermediate balancing scheme according to a candidate time performance parameter corresponding to the candidate optimized scheme and the time performance parameter.

In some embodiments, the acquisition module 310 includes:

an information acquisition unit, configured to acquire parameter information and input/output information corresponding to each network layer; and a calculation unit, configured to calculate the theoretical computational amount by use of the parameter information, and calculate the data traffic by use of the input/output information.

In some embodiments, the apparatus further includes:

a splitting module, configured to split the target model according to the final balancing scheme, so as to obtain a plurality of network layer groups; and a sending module, configured to send each network layer group to the corresponding computing device for training.

A load balancing device for a parallel model training task in the embodiments of the present disclosure will be introduced below. The load balancing device for a parallel model training task described below may make corresponding references mutually with the load balancing method for a parallel model training task described above.

Figure 4:
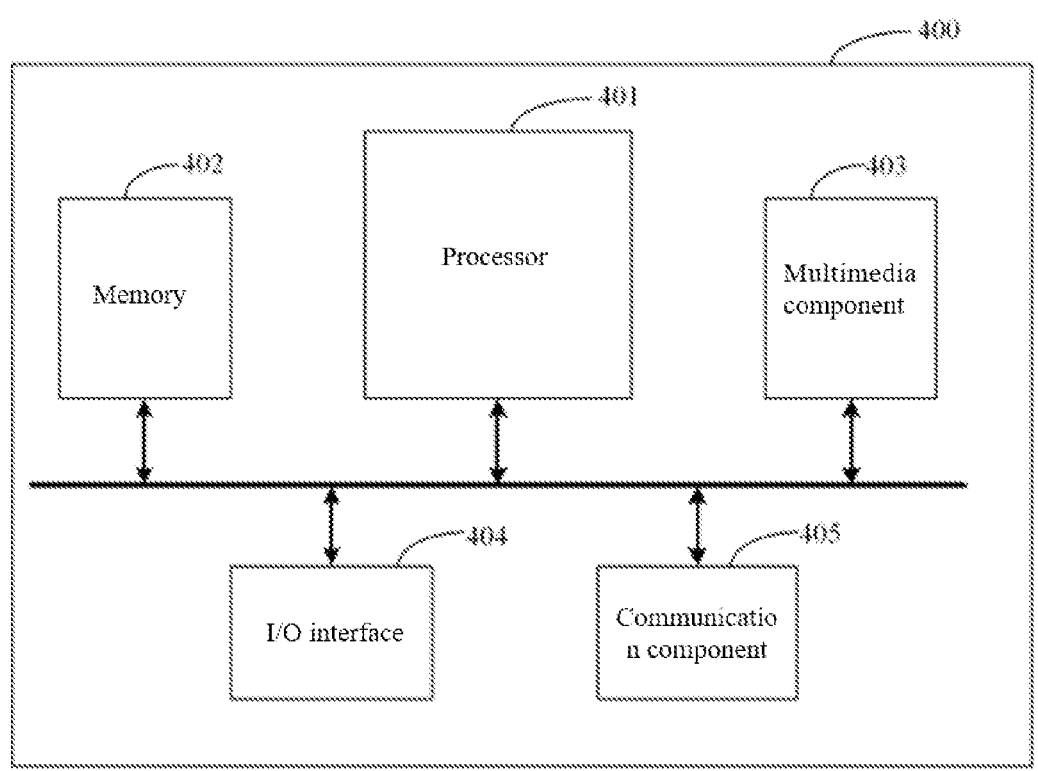
FIG. 4 is a schematic structural diagram of a load balancing device for a parallel model training task according to an embodiment of the present disclosure.

Referring to FIG. 4, FIG. 4 is a schematic structural diagram of a load balancing device for a parallel model training task according to an embodiment of the present disclosure. The load balancing device 400 for a parallel model training task may include a processor 401 and a memory 402, and may further include one or more of a multimedia component 403, an information Input/Output (I/O) interface 404, and a communication component 405.

The processor 401 is configured to control overall operations of the load balancing device 400 for a parallel model training task, so as to complete all or part of the steps in the above-mentioned load balancing method for a parallel model training task. The memory 402 is configured to store various types of data so as to support operations on the load balancing device 400 for a parallel model training task. For example, the data may include instructions for any application or method operated on the load balancing device 400 for a parallel model training task, as well as data related to the application program. The memory 402 may be implemented by a volatile or nonvolatile storage device of any type or a combination thereof, such as one or more of a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk.

The multimedia component 403 may include a screen and an audio component. The screen may be, for example, a touch screen. The audio component is configured to output and/or input an audio signal. For example, the audio component may include a microphone configured to receive an external audio signal. The received audio signal may further be stored in the memory 402 or sent by the communication component 405. The audio component further includes at least one speaker configured to output an audio signal. The I/O interface 404 provides an interface between the processor 401 and another interface module, such as a keyboard, a mouse, or a button. The button may be a virtual button or a physical button. The communication component 405 is configured for wired or wireless communication between the load balancing device 400 for a parallel model training task and another device. Wireless communication is, for example, Wireless Fidelity (Wi-Fi), Bluetooth, Near Field Communication (NFC), 2nd-Generation (2G), 3rd-Generation (3G), 4th-Generation (4G), or a combination thereof, and thus the communication component 405 may correspondingly include a Wi-Fi component, a Bluetooth component, an NFC component, etc.

The load balancing device 400 for a parallel model training task may be implemented by one or more Application Specific Integrated Circuits (ASICs), Digital Signal Processors (DSPs), Digital Signal Processing Devices (DSPDs), Programmable Logic Devices (PLDs), FPGAs, controllers, micro-controllers, microprocessors, or other electronic components, to execute the load balancing method for a parallel model training task in the above-mentioned embodiments.

A computer-readable storage medium provided in the embodiments of the present disclosure will now be introduced. The computer-readable storage medium described below may make corresponding references mutually with the load balancing method for a parallel model training task described above.

The present disclosure also provides a computer-readable storage medium having stored therein a computer program, where the computer program is executed by a processor to implement the steps of the load balancing method for a parallel model training task.

The computer-readable storage medium may include various media capable of storing program codes, such as a U disk, a mobile hard disk, a ROM, a Random Access Memory (RAM), a magnetic disk, or an optical disk.

Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively briefly, and related parts refer to the descriptions about the method.

Those skilled in the art may further realize that the units and algorithm steps of each example described in combination with the embodiments disclosed herein may be implemented by electronic hardware, computer software, or a combination thereof. For clarity of description about the exchangeability of hardware and software, the compositions and steps of each example have been generally described in the foregoing description according to functions. Whether these functions are executed by hardware or software depends on specific applications and design constraints of the technical solutions. Those skilled in the art may realize the described functions for each specific application by different methods, but such realization shall fall within the scope of the present disclosure.

The steps of the method or algorithm described in combination with the embodiments disclosed herein may directly be implemented by hardware, a software module executed by the processor, or a combination thereof. The software module may be arranged in a RAM, an internal memory, a ROM, an electrically PROM, an EEPROM, a register, a hard disk, a removable disk, a Compact Disc Read-Only Memory (CD-ROM), or a storage medium in any other form well known in this art.

It is finally to be noted that relational terms herein, such as first and second, are only for distinguishing one entity or operation from another and do not necessarily require or imply the existence of any practical relation or sequence between these entities or operations. Moreover, terms "include" and "contain" or any other variation thereof is intended to cover nonexclusive inclusions, whereby a process, method, object, or device including a series of elements not only includes those elements but also includes other elements that are not clearly listed, or further includes elements intrinsic to the process, the method, the object, or the device.

The load balancing method for a parallel model training task, the load balancing apparatus for a parallel model training task, the load balancing device for a parallel model training task, and the computer-readable storage medium provided in the present disclosure are introduced above in detail. The principle and implementation modes of the present disclosure are set forth herein with specific examples, and the descriptions made to the embodiments are only for helping understand the method of the present disclosure and the core concept thereof. In addition, those ordinarily skilled in the art may make variations to the specific implementation modes and the application scope according to the concept of the present disclosure. In summary, the contents of the specification should not be understood as limitations on the present disclosure.

What is claimed is:

1. A load balancing method for a parallel model training task, comprising:
   acquiring data traffic and a theoretical computational amount of each of a plurality of network layers in a target model, wherein the theoretical computational amount is a theoretical total number of computing resources required by training of a network layer;
   determining a theoretical computing capability of each of a plurality of computing devices, and obtaining an initial computational amount corresponding to each of the plurality of computing devices according to the theoretical computing capability and the theoretical computational amount respectively, where the theoretical computing capability represents a computing speed of a computing device;
   performing a load balancing operation according to the initial computational amount by using a multiple device critical layer position division rule, so as to obtain a plurality of initial balancing schemes, wherein the performing a load balancing operation according to the initial computational amount comprises:
      dividing the plurality of network layers to each of the plurality of computing devices according to the initial computational amount in network layer order, and detecting a device critical layer;
      in response to detecting the device critical layer:
         dividing the device critical layer to a preceding computing device, so as to obtain a first balancing scheme, wherein the preceding computing device is a computing device that a preceding network layer corresponding to the device critical layer belongs to;
         dividing the device critical layer to a subsequent computing device, so as to obtain a second balancing scheme, wherein the subsequent computing device is a computing device that a subsequent network layer corresponding to the device critical layer belongs to; and
         determining the first balancing scheme and the second balancing scheme as the plurality of initial balancing schemes;
      compiling statistics on time performance parameters corresponding to each of the plurality of initial balancing schemes respectively, and determining an intermediate balancing scheme from the plurality of initial balancing schemes according to the respective time performance parameters,
      wherein the compiling statistics further comprises:
         compiling statistics on computing time corresponding to each of the plurality of computing devices in each of the plurality of initial balancing schemes, and calculating a time average and a time standard deviation corresponding to each of the plurality of initial balancing schemes respectively by use of the respective computing time, so as to obtain the time performance parameter;

determining whether the time average is less than a first threshold and whether the time standard deviation is less than a second threshold;

determining one or more from the plurality of initial balancing schemes for which the time average is less than the first threshold and the time standard deviation is less than the second threshold as one or more candidate balancing schemes;

when there is one candidate balancing scheme, determining the one candidate balancing scheme as the intermediate balancing scheme; and when there are a plurality of candidate balancing schemes, selecting one candidate balancing scheme as the intermediate balancing scheme from the plurality of candidate balancing schemes according to a preset selection rule;

adjusting the intermediate balancing scheme according to the data traffic, to obtain a final balancing scheme;

splitting the target model according to the final balancing scheme, to obtain a plurality of network layer groups, and send each network layer group to the corresponding computing device of the plurality of computing devices; and training, each network layer group, by the corresponding device of the plurality of computing devices.

2. The load balancing method for a parallel model training task according to claim 1, wherein the adjusting the intermediate balancing scheme according to the data traffic, so as to obtain a final balancing scheme comprises:

obtaining a communication time of each of the plurality of computing devices according to the data traffic and a network layer communication speed of each of the plurality of computing devices, and obtaining total time corresponding to each of the plurality of the computing devices by use of the communication time and computing time;

determining maximum total time, and performing a network layer division optimization process on a target computing device of the plurality of the computing devices corresponding to the maximum total time in the intermediate balancing scheme, so as to obtain an optimized balancing scheme;

determining the optimized balancing scheme as the intermediate balancing scheme, and updating an optimization count; and determining the intermediate balancing scheme as the final balancing scheme when the optimization count reaches a preset optimization count threshold.

3. The load balancing method for a parallel model training task according to claim 2, wherein the performing a network layer division optimization process on a target computing device of the plurality of the computing devices corresponding to the maximum total time in the intermediate balancing scheme, so as to obtain an optimized balancing scheme comprises:

reducing one layer from network layers corresponding to the target computing device, and adjusting network layers corresponding to other computing devices of the plurality of the computing devices, so as to obtain a first optimized scheme;

reducing two layers from the network layers corresponding to the target computing device, and adjusting network layers corresponding to the other computing devices of the plurality of the computing devices, so as to obtain a second optimized scheme;

compiling statistics on a first-time performance parameter corresponding to the first optimized scheme and a second time performance parameter corresponding to the second optimized scheme;

determining a candidate optimized scheme from the first optimized scheme and the second optimized scheme according to the first-time performance parameter and the second time performance parameter; and determining the optimized balancing scheme from the candidate optimized scheme and the intermediate balancing scheme according to a candidate time performance parameter corresponding to the candidate optimized scheme and the time performance parameter.

4. The load balancing method for a parallel model training task according to claim 2, wherein the detecting a device critical layer comprises:

determining whether a first current load of a target computing device is less than a corresponding initial computational amount;

when the first current load is less than the corresponding initial computational amount, dividing a target network layer of the plurality of network layers to the target computing device;

determining whether a second current load of the target computing device is greater than the corresponding initial computational amount; and when the second current load is greater than the corresponding initial computational amount, determining the target network layer as the device critical layer.

5. The load balancing method for a parallel model training task according to claim 1, wherein the acquiring data traffic and a theoretical computational amount of each of a plurality of network layers in a target model comprises:

acquiring parameter information and input/output information corresponding to each of the plurality of network layers; and calculating the theoretical computational amount by use of the parameter information, and calculating the data traffic by use of the input/output information.

6. The load balancing method for a parallel model training task according to claim 1, wherein, the method further comprises:

when there is no candidate balancing scheme, determining the plurality of initial balancing schemes as the plurality of candidate balancing schemes, and selecting the intermediate balancing scheme from the plurality of candidate balancing schemes according to the preset selection rule.

7. A load balancing device for a parallel model training task, comprising a memory and a processor, wherein
the memory is configured to store a computer program; and
the processor is configured to execute the computer program, the computer program is configured to cause the processor to perform operations comprising:

acquiring data traffic and a theoretical computational amount of each of a plurality of network layers in a target model, wherein the theoretical computational amount is a theoretical total number of computing resources required by training of a network layer;

determining a theoretical computing capability of each of a plurality of computing devices, and obtaining an initial computational amount corresponding to each of the plurality of computing devices according to the theoretical computing capability and the theoretical computational amount respectively, where the theoretical computing capability represents a computing speed of a computing device;

performing a load balancing operation according to the initial computational amount by using a multiple device critical layer position division rule, so as to obtain a plurality of initial balancing schemes, wherein the performing a load balancing operation according to the initial computational amount comprises:

dividing the plurality of network layers to each of the plurality of computing devices according to the initial computational amount in network layer order, and detecting a device critical layer;

in response to detecting the device critical layer:

dividing the device critical layer to a preceding computing device, so as to obtain a first balancing scheme, wherein the preceding computing device is a computing device that a preceding network layer corresponding to the device critical layer belongs to;

dividing the device critical layer to a subsequent computing device, so as to obtain a second balancing scheme, wherein the subsequent computing device is a computing device that a subsequent network layer corresponding to the device critical layer belongs to; and determining the first balancing scheme and the second balancing scheme as the plurality of initial balancing schemes;

compiling statistics on time performance parameters corresponding to each of the plurality of initial balancing schemes respectively, and determining an intermediate balancing scheme from the plurality of initial balancing schemes according to the respective time performance parameters, wherein the compiling statistics further comprises:

compiling statistics on computing time corresponding to each of the plurality of computing devices in each of the plurality of initial balancing schemes, and calculating a time average and a time standard deviation corresponding to each of the plurality of initial balancing schemes respectively by use of the respective computing time, so as to obtain the time performance parameter;

determining whether the time average is less than a first threshold and whether the time standard deviation is less than a second threshold;

determining one or more from the plurality of initial balancing schemes for which the time average is less than the first threshold and the time standard deviation is less than the second threshold as one or more candidate balancing schemes;

when there is one candidate balancing scheme, determining the one candidate balancing scheme as the intermediate balancing scheme; and when there are a plurality of candidate balancing schemes, selecting one candidate balancing scheme as the intermediate balancing scheme from the plurality of candidate balancing schemes according to a preset selection rule;

adjusting the intermediate balancing scheme according to the data traffic, to obtain a final balancing scheme;

splitting the target model according to the final balancing scheme, to obtain a plurality of network layer groups, and send each network layer group to the corresponding computing device of the plurality of computing devices; and training, each network layer group, by the corresponding device of the plurality of computing devices.

8. The load balancing device according to claim 7, wherein the adjusting the intermediate balancing scheme according to the data traffic, so as to obtain a final balancing scheme comprises:

obtaining a communication time of each of the plurality of computing devices according to the data traffic and a network layer communication speed of each of the plurality of computing devices, and obtaining total time corresponding to each of the plurality of the computing devices by use of the communication time and computing time;

determining maximum total time, and performing a network layer division optimization process on a target computing device of the plurality of the computing devices corresponding to the maximum total time in the intermediate balancing scheme, so as to obtain an optimized balancing scheme;

determining the optimized balancing scheme as the intermediate balancing scheme, and updating an optimization count; and determining the intermediate balancing scheme as the final balancing scheme when the optimization count reaches a preset optimization count threshold.

9. The load balancing device according to claim 8, wherein the performing a network layer division optimization process on a target computing device of the plurality of the computing devices corresponding to the maximum total time in the intermediate balancing scheme, so as to obtain an optimized balancing scheme comprises:

reducing one layer from network layers corresponding to the target computing device, and adjusting network layers corresponding to other computing devices of the plurality of the computing devices, so as to obtain a first optimized scheme;

reducing two layers from the network layers corresponding to the target computing device, and adjusting network layers corresponding to the other computing devices of the plurality of the computing devices, so as to obtain a second optimized scheme;

compiling statistics on a first-time performance parameter corresponding to the first optimized scheme and a second time performance parameter corresponding to the second optimized scheme;

determining a candidate optimized scheme from the first optimized scheme and the second optimized scheme according to the first-time performance parameter and the second time performance parameter; and determining the optimized balancing scheme from the candidate optimized scheme and the intermediate balancing scheme according to a candidate time performance parameter corresponding to the candidate optimized scheme and the time performance parameter.

10. The load balancing device according to claim 7, wherein the acquiring data traffic and a theoretical computational amount of each of a plurality of network layers in a target model comprises:

acquiring parameter information and input/output information corresponding to each of the plurality of network layers; and calculating the theoretical computational amount by use of the parameter information, and calculating the data traffic by use of the input/output information.

11. A non-transitory computer-readable storage medium, being configured to store a computer program, and upon execution by a processor, the computer program causes the processor to perform operations comprising:

acquiring data traffic and a theoretical computational amount of each of a plurality of network layers in a target model, wherein the theoretical computational amount is a theoretical total number of computing resources required by training of a network layer;

determining a theoretical computing capability of each of a plurality of computing devices, and obtaining an initial computational amount corresponding to each of the plurality of computing devices according to the theoretical computing capability and the theoretical computational amount respectively, where the theoretical computing capability represents a computing speed of a computing device;

performing a load balancing operation according to the initial computational amount by using a multiple device critical layer position division rule, so as to obtain a plurality of initial balancing schemes, wherein the performing a load balancing operation comprises:
dividing the plurality of network layers to each of the plurality of computing devices according to the initial computational amount in network layer order, and detecting a device critical layer;
in response to detecting the device critical layer:
dividing the device critical layer to a preceding computing device, so as to obtain a first balancing scheme, wherein the preceding computing device is a computing device that a preceding network layer corresponding to the device critical layer belongs to;
dividing the device critical layer to a subsequent computing device, so as to obtain a second balancing scheme, wherein the subsequent computing device is a computing device that a subsequent network layer corresponding to the device critical layer belongs to; and
determining the first balancing scheme and the second balancing scheme as the plurality of initial balancing schemes;

compiling statistics on time performance parameters corresponding to each of the plurality of initial balancing schemes respectively, and determining an intermediate balancing scheme from the plurality of initial balancing schemes according to the respective time performance parameters;

wherein the compiling statistics further comprises:
compiling statistics on computing time corresponding to each of the plurality of computing devices in each of the plurality of initial balancing schemes, and calculating a time average and a time standard deviation corresponding to each of the plurality of initial balancing schemes respectively by use of the respective computing time, so as to obtain the time performance parameter;
determining whether the time average is less than a first threshold and whether the time standard deviation is less than a second threshold;
determining one or more from the plurality of initial balancing schemes for which the time average is less than the first threshold and the time standard deviation is less than the second threshold as one or more candidate balancing schemes;
when there is one candidate balancing scheme, determining the one candidate balancing scheme as the intermediate balancing scheme; and
when there are a plurality of candidate balancing schemes, selecting one candidate balancing scheme as the intermediate balancing scheme from the plurality of candidate balancing schemes according to a preset selection rule;

adjusting the intermediate balancing scheme according to the data traffic, to obtain a final balancing scheme;

splitting the target model according to the final balancing scheme, to obtain a plurality of network layer groups, and send each network layer group to the corresponding computing device of the plurality of computing devices; and training, each network layer group, by the corresponding device of the plurality of computing devices.

12. The non-transitory computer-readable storage medium according to claim 11, wherein the adjusting the intermediate balancing scheme according to the data traffic, so as to obtain a final balancing scheme comprises:
obtaining a communication time of each of the plurality of computing devices according to the data traffic and a network layer communication speed of each of the plurality of computing devices, and obtaining total time corresponding to each of the plurality of the computing devices by use of the communication time and computing time;
determining maximum total time, and performing a network layer division optimization process on a target computing device of the plurality of the computing devices corresponding to the maximum total time in the intermediate balancing scheme, so as to obtain an optimized balancing scheme;
determining the optimized balancing scheme as the intermediate balancing scheme, and updating an optimization count; and
determining the intermediate balancing scheme as the final balancing scheme when the optimization count reaches a preset optimization count threshold.

13. The non-transitory computer-readable storage medium according to claim 12, wherein the performing a network layer division optimization process on a target computing device of the plurality of the computing devices corresponding to the maximum total time in the intermediate balancing scheme, so as to obtain an optimized balancing scheme comprises:
reducing one layer from network layers corresponding to the target computing device, and adjusting network layers corresponding to other computing devices of the plurality of the computing devices, so as to obtain a first optimized scheme;
reducing two layers from the network layers corresponding to the target computing device, and adjusting network layers corresponding to the other computing devices of the plurality of the computing devices, so as to obtain a second optimized scheme;
compiling statistics on a first-time performance parameter corresponding to the first optimized scheme and a second time performance parameter corresponding to the second optimized scheme;
determining a candidate optimized scheme from the first optimized scheme and the second optimized scheme according to the first-time performance parameter and the second time performance parameter; and
determining the optimized balancing scheme from the candidate optimized scheme and the intermediate balancing scheme according to a candidate time performance parameter corresponding to the candidate optimized scheme and the time performance parameter.

14. The non-transitory computer-readable storage medium according to claim 11, wherein the acquiring data traffic and a theoretical computational amount of each of a plurality of network layers in a target model comprises:
   acquiring parameter information and input/output information corresponding to each of the plurality of network layers; and
   calculating the theoretical computational amount by use of the parameter information, and calculating the data traffic by use of the input/output information.

* * * * *